US008599653B1

(12) United States Patent
Mallary et al.

(10) Patent No.: US 8,599,653 B1
(45) Date of Patent: Dec. 3, 2013

(54) SYSTEMS AND METHODS FOR REDUCING CONDENSATION ALONG A SLIDER AIR BEARING SURFACE IN ENERGY ASSISTED MAGNETIC RECORDING

(75) Inventors: Michael L. Mallary, Sterling, MA (US); Bernhard E. Knigge, San Jose, CA (US); Jih-Ping Peng, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/610,157

(22) Filed: Sep. 11, 2012

(51) Int. Cl.
*G11B 11/00* (2006.01)

(52) U.S. Cl.
USPC .................................. 369/13.32; 360/125.03

(58) Field of Classification Search
None
See application file for complete search history.

(56) References Cited

U.S. PATENT DOCUMENTS

| 6,584,676 B1 * | 7/2003 | Chang et al. ............... 29/603.12 |
| 7,526,856 B2 | 5/2009 | Nikitin |
| 8,077,418 B1 | 12/2011 | Hu et al. |
| 2011/0303637 A1 | 12/2011 | Araki et al. |
| 2012/0045662 A1 | 2/2012 | Zou et al. |

OTHER PUBLICATIONS

W. A. Challener, et al., "Heat-Assisted Magnetic Recording by a Near-Field Transducer With Efficient Optical Energy Transfer", www.nature.com/naturephotonics, Nature Photonics, vol. 3, Apr. 2009 (published online: Mar. 2009), pp. 220-224.
Jia-Yang Juang, et al., "Alternate Air Bearing Slider Designs for Areal Density of 1 Tb/in2", IEEE Transactions on Magnetics, vol. 42, No. 2, Feb. 2006, pp. 241-246.
B. Strom, et al., "Burnishing Heads In-Drive for Higher Density Recording", IEEE Transactions on Magnetics, vol. 40, No. 1, Jan. 2004, pp. 345-348.
Gurinder P. Singh, et al., "A Novel Wear-In-Pad Approach to Minimizing Spacing at the Head/Disk Interface", IEEE Transactions on Magnetics, vol. 40, No. 4, Jul. 2004, pp. 3148-3152.

\* cited by examiner

*Primary Examiner* — Paul Huber (57) ABSTRACT

Systems and methods for reducing condensation along an air bearing surface of a slider in an energy assisted magnetic recording system are provided. In one embodiment, the invention relates to a slider configured to reduce condensation along an air bearing surface in an energy assisted magnetic recording system, the slider including an air bearing surface (ABS), a write transducer including a portion disposed at the ABS, a hot spot region disposed along the ABS, where the hot spot region includes the portion of the write transducer at the ABS, and a trench surrounding the hot spot region.

28 Claims, 6 Drawing Sheets

SYSTEMS AND METHODS FOR REDUCING CONDENSATION ALONG A SLIDER AIR BEARING SURFACE IN ENERGY ASSISTED MAGNETIC RECORDING

FIELD

The present invention relates to magnetic transducers for hard disk drives, and more specifically to systems and methods for reducing condensation along an air bearing surface of a slider used in energy assisted magnetic recording.

BACKGROUND

Hard disk drives use magnetic media to store data and a movable slider having a read/write head positioned over the magnetic media to selectively read data from and write data to the magnetic media. Energy assisted magnetic recording (EAMR) is intended to be used to record information in such hard disk drives at certain high areal densities (e.g., areal densities greater than 1.5 terabytes per square inch). In EAMR, a hot spot at about 400 degrees Celsius (C) is generated at the air bearing surface (ABS) of a slider by a near field transducer (NFT). This hot spot (e.g., NFT and/or adjacent waveguide core) enables the switching of very high anisotropy, thermally stable L10 FePt grains in the magnetic media with the magnetic field of a write pole. The NFT is optically excited by laser light that is conducted to the vicinity of the NFT by a wave guide consisting of a core (e.g., $Ta_2O_5$ or other suitable materials) surrounded by a cladding having a lower index of refraction (e.g., ceramic such as $SiO_2$) than the core. However, the hot spot coupled with certain environmental conditions in the hard disk drives can degrade the surrounding cladding and pole tip. As such, systems and methods for reducing degradation of a hot spot cladding in energy assisted magnetic recording are needed.

SUMMARY

Aspects of the invention relate to systems and methods for reducing condensation along an air bearing surface of a slider in an energy assisted magnetic recording system. In one embodiment, the invention relates to a slider configured to reduce condensation along an air bearing surface in an energy assisted magnetic recording system, the slider including an air bearing surface (ABS), a write transducer including a portion disposed at the ABS, a hot spot region disposed along the ABS, where the hot spot region includes the portion of the write transducer at the ABS, and a trench surrounding the hot spot region.

In another embodiment, the invention relates to a method for forming a slider configured to reduce condensation along an air bearing surface in an energy assisted magnetic recording system, the method including providing a slider including an air bearing surface (ABS), a write transducer including a portion disposed at the ABS, a hot spot region disposed along the ABS, where the hot spot region includes the portion of the write transducer at the ABS, and providing a trench surrounding the hot spot region.

DETAILED DESCRIPTION

As described above, the hot spot (e.g., NFT and/or adjacent waveguide core) can be degraded by certain environmental conditions in the hard disk drives. More specifically, a very serious wave guide degradation phenomena has been detected in EAMR heads. The wave guide cladding is being chemically etched away by water that condenses at the very high pressure (e.g., greater than 60 atmospheres) of the ABS pad that contains the head structure. This etching can be quite extreme (e.g., 3 nanometers per minute at 170 C) for the original cladding material which often consists of vacuum deposited $Al_2O_3$. Numerous experimental studies have confirmed that this failure mode requires the presence of water in the air. Simulations show that water is expected to condense in the high pressure regions of the ABS.

Various experiments have also revealed that $SiO_2$ can etch an order of magnitude more slowly than $Al_2O_3$. Therefore, one mitigating approach to the problem is to use $SiO_2$ cladding. Though it greatly reduces the cladding erosion problem, it is far from sufficient for ensuring a head lifetime of many years. Any breach in the ABS carbon over coat (COC) at the hot spot allows water to erode the cladding and corrode the pole. These breaches usually occur at the boundaries between materials where the differential etching and lapping rates in slider manufacturing process steps produce uneven surfaces that are not well covered by the COC. However, even with perfect COC coverage, an accumulation of head media contact events will eventually cause hot spot exposure and degradation. Sealing water from EAMR type hard drives is another potential solution but can be expensive and cost prohibitive. In current slider designs, use of the carbon over coat is very common. However, in future slider designs, other suitable materials can be used as a slider over coat.

In order to prevent water condensation at the wave guide, another solution considered involves creating a low pressure trench around the head using conventional ABS masking techniques and etching processes. However, the dimensional criteria for this type of process requires that the trench outer boundary (e.g., the low pressure region radius) be very far from the hot spot (e.g., radius of about 70 microns) so that the entirety of the dynamic fly height (DFH) bulge is at low pressure. This will generally result in low push back of the ABS as the spacing is brought down to the target value. By the accounts of most ABS designers, low push back of the ABS is a serious reliability issue in that it makes it more difficult to maintain the target spacing (e.g., between the hot spot and the media). More importantly, contact events with the media due to asperities, lube pick up, disk waviness, and the like, become much more violent. Therefore, in several embodiments, it is desirable to provide an ABS design and an enabling process that can reduce the pressure at the EAMR write head while preserving much or almost all of the ABS push back force. Note that push back is discussed in greater detail below.

Figure 1:
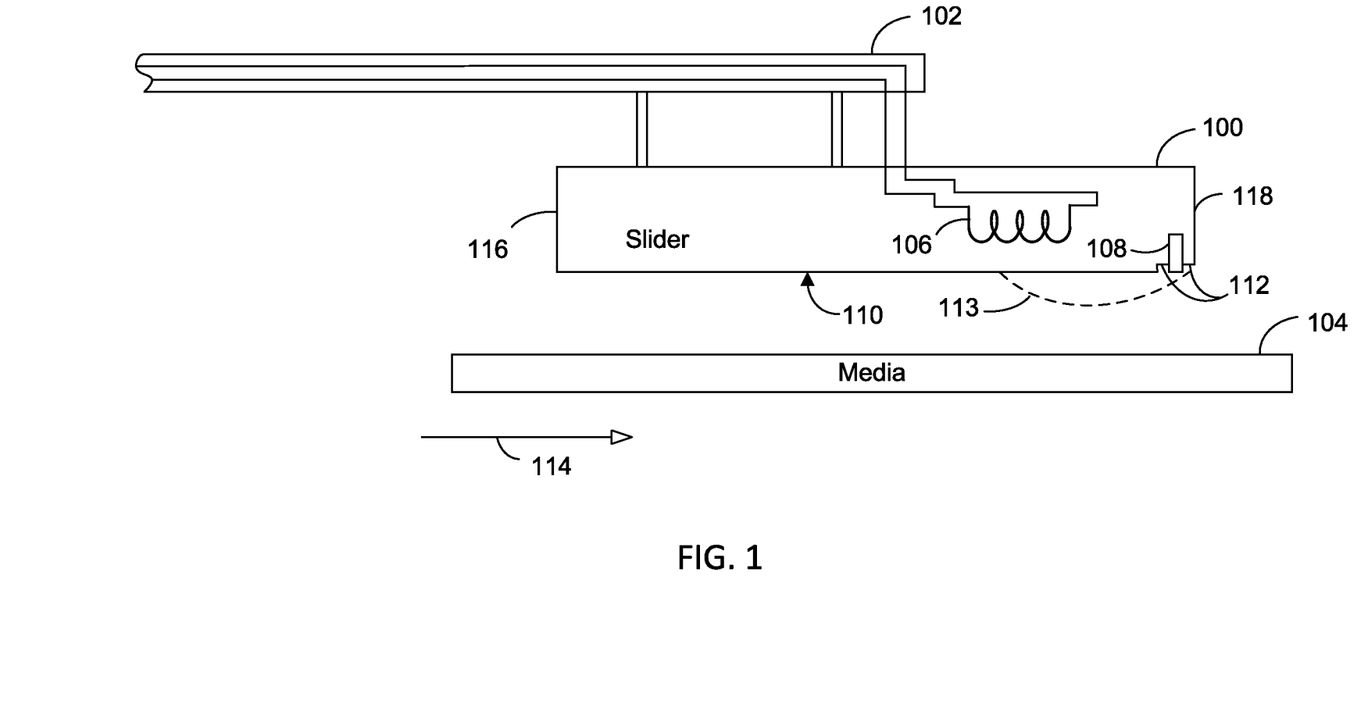
FIG. 1 is a schematic side cross sectional view of a slider suspended by a support arm over a magnetic media, where the slider includes a dynamic fly height (DFH) heating element proximate a magnetic transducer for reading from and writing to the media and an air bearing surface (ABS) facing the media in accordance with one embodiment of the invention.

DFH technology achieves local flying height reduction by applying a voltage to the heater element embedded in the slider body (see e.g., heater element 106 in FIG. 1). Heat supplied by the heater element increases the temperature of the slider in the heater's vicinity, and this increase in temperature, in turn, causes the surface of the slider to protrude as a result of thermal expansion of the surrounding material. In principle, this protrusion (see e.g., DFH bulge 113 in FIG. 1) will bring the read/write head closer to the disk surface, thus reducing the flying height and allowing for greater resolution in the read/write process. The hot spot (e.g., the area including the NFT and the waveguide core where writing occurs) is often at the highest point of the protrusion (e.g., DFH bulge) or near the highest point of the protrusion to protect the hot spot from damage from media contact events.

As to push back, it is noted that during the resulting temperature induced protrusion process (e.g., DFH bulge 113), however, the slider will be pushed back by a protrusion induced increase in the air pressure acting on the slider (e.g., push back) due to the squeezed layer of air within the head/disk interface. This additional air pressure acts counter to the desired flying height reduction that the heater induced slider protrusion is meant to produce. Thus it is highly desirable to provide a method of decreasing flying height by a thermal process, while not necessarily allowing that very decrease to counter the desired effect. At the same time, a certain amount of push back is highly desirable for long term reliability as discussed above. Thus, in several embodiments, there is an optimal amount of push back which must be achieved that leads to acceptable reliability and sufficiently low DFH power. In several embodiments, push back can be calculated by taking the ratio of the height of the DFH bulge at a heater power causing media contact divided by the slider media spacing with no heater power and then subtracting 1. In one such embodiment, an acceptable push back is about 0.35. For example, suppose a slider has a media spacing of about 10 nm with no DFH heater power and the contact DFH setting causes a 13.5 nm bulge extending from the ABS. In such case, 13.5/10 minus 1 provides a push back of 0.35. In other embodiments, other suitable values for spacing and heating power can be used with different resulting push back values.

Referring now to the drawings, embodiments of sliders configured to reduce condensation along the ABS of the sliders in energy assisted magnetic recording systems and methods for forming such sliders are illustrated and seek to address the problems detailed above. The sliders include an air bearing surface (ABS), write transducer including a portion disposed at the ABS, a hot spot region positioned along the ABS, where the hot spot region includes the portion of the write transducer at the ABS, and a trench surrounding the hot spot region. In several embodiments, the trench serves multiple purposes. The trench can create a low pressure zone (e.g., area of less than about 15 microns) in the trench that substantially inhibits the condensation of water and greatly reduces the temperature at which the water will boil away. This low pressure zone can thus reduce the potential dissolution of the waveguide and corrosion of the pole tip resulting from the water. In addition, using a preselected size for the trench can preserve a preselected amount of push back of the ABS at low spacing from the media, thereby reducing potential head media contact events and enhancing the lifetime of the slider and media (e.g., lifetime of the associated disk drive).

In most embodiments, the trench extends to a trailing edge of the slider. In a number of embodiments, the region defined by the trench is smaller than the region defined by the DFH bulge, which thereby preserves a preselected amount of push back.

FIG. 1 is a schematic side cross sectional view of a slider 100 suspended by a support arm 102 over a magnetic media 104, where the slider includes a dynamic fly height (DFH) heating element 106 proximate a magnetic transducer 108 for reading from and writing to the media 104 and an air bearing surface (ABS) 110 facing the media 104 in accordance with one embodiment of the invention. The slider 100 also includes a trench 112 surrounding the magnetic transducer 108 along the ABS 110. The slider 100 has a rectangular block type shape while the media 104 is disk shaped.

In operation, the media 104 is rotated to move in the direction indicated by the arrow 114 and the support arm 102 moves the slider 100 to various locations above the media enabling the magnetic transducer 108 of the slider 100 to read from and write to various locations on the media 104. Based on the direction of the media 104 indicated by arrow 114, the left side of the slider 100 is the leading edge 116 and the right side of the slider 100 including the magnetic transducer 108 is the trailing edge 118. At the time of writing, and possibly at the time of reading, the heating element 106 may be activated by control circuitry (not shown) such that a DFH bulge 113 is created proximate the magnetic transducer 108 along the ABS 110. The DFH bulge or protrusion 113 can bring the writing pole (or reader) of the magnetic transducer 108 closer to the media 104 thereby reducing flying height and enabling greater resolution in the read or write processes. The hot spot region can be the highest region from the ABS when the DFH heating element is activated and typically is defined by an area or region including one or more of the write pole, the near field transducer (NFT), and the waveguide core which are components of the magnetic transducer 108. In some embodiments, the hot spot region can be nearly, and adjacent to, the highest region from the ABS when the DFH heating element is activated depending on design considerations.

As discussed above, the trench 112 can reduce condensation along the ABS while also preserving a certain amount of desirable push back on the ABS to maintain spacing and substantially prevent head media contact. In several embodiments, the slider 100 has a rectangular block shaped body with a patterned ABS. In some embodiments, the slider can include more than one DFH bulge. In one such case, the slider includes a first DFH bulge for the writer and a second DFH bulge for the reader. In some embodiments, the second DFH bulge is used to compensate for, or modify the effect of, the first DFH bulge.

Figure 2:
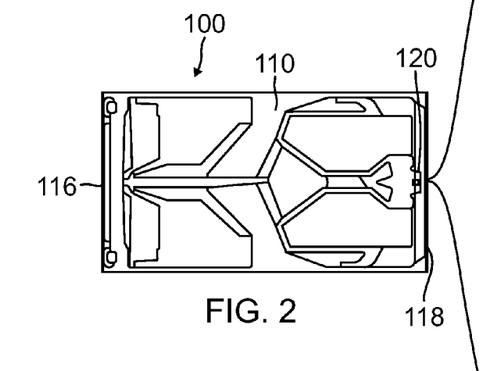
FIG. 2 is a top view of the ABS of the slider of FIG. 1 illustrating an ABS design for reducing condensation along the ABS in an energy assisted magnetic recording system, where the ABS design includes a trench along the ABS that is configured to surround a hot spot region of the magnetic transducer and thereby inhibit the condensation of water while maintaining a preselected degree of push back at the ABS in accordance with one embodiment of the invention.
Figure 2A:
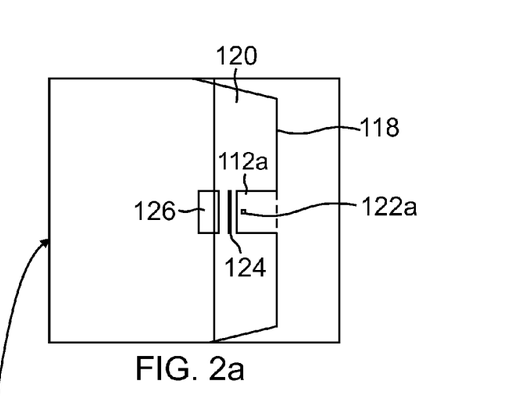
FIG. 2a is an expanded top view of a portion of the slider of FIG. 2 including the hot spot region and surrounding trench where the trench extends to the trailing edge of the slider and inert cavities associated with formation of the trench in accordance with a first primary embodiment of the invention.
Figure 2B:
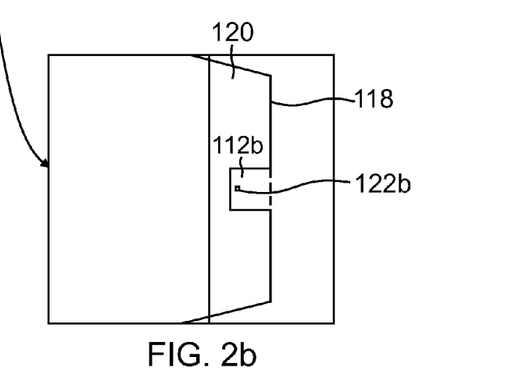
FIG. 2b is an expanded top view of a portion of the slider of FIG. 2 including the hot spot region and surrounding trench where the trench extends to the trailing edge of the slider where the inert cavities have been eliminated in accordance with a second primary embodiment of the invention.

FIG. 2 is a top view of the ABS 110 of the slider 100 of FIG. 1 illustrating an ABS design for reducing condensation along the ABS in an energy assisted magnetic recording system, where the ABS design includes a trench 112 (not visible in FIG. 2 but see FIG. 1, 2a, or 2b) along the ABS that is configured to surround a hot spot region of the magnetic transducer 108 and thereby inhibit the condensation of water while maintaining a preselected degree of push back at the ABS in accordance with one embodiment of the invention. The ABS 110 of the slider 100 has a preselected patterned surface topography including a number of surface features for aerodynamically supporting and flying the slider 100 above the media. One such surface feature is a trailing pad 120 positioned near the trailing edge 118 of the slider 100. The region defined by the trailing pad 120 can include the magnetic transducer 108 of the slider 100. The trench 112 may be formed along the trailing pad 120 in several different configurations depending on desired placement considerations and processing considerations. FIGS. 2a and 2b illustrate some exemplary configurations of the trench.

Figure 6:
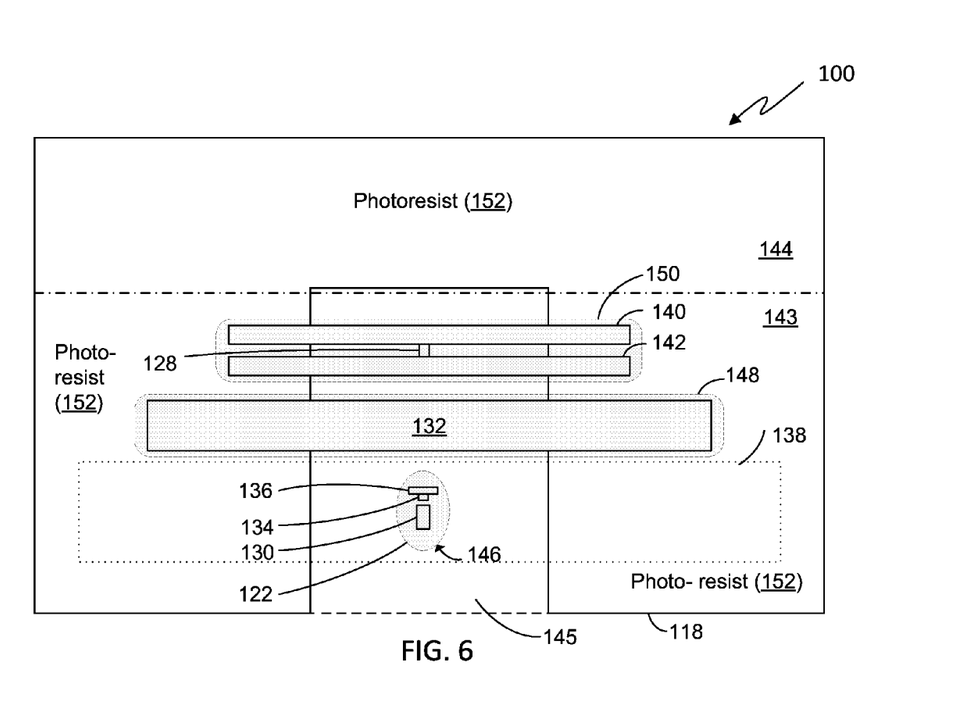
FIG. 6 is an expanded top view of the ABS portion of the slider of FIG. 2a showing the components of the magnetic transducer including a reader, a writer including a write pole and a return pole, and a near field transducer (NFT) including a wave guide core and a cladding and various masks used during a sub-process for forming the trench that surrounds the hot spot region in accordance with one embodiment of the invention.

FIG. 2a is an expanded top view of a portion of the slider 100 of FIG. 2 including the hot spot region 122a and surrounding trench 112a where the trench 112a extends to the trailing edge 118 of the slider and includes inert cavities (124, 126) associated with formation of trench in accordance with a primary embodiment of the invention. During the etching process for forming the trench 112a, a couple of incidental features (e.g., inert cavities 124, 126) may be unintentionally formed due to insufficient tolerances in current lithographic processes. In the etching process, the substantially rectangular lithographic trench or moat pattern 112a extends upstream (e.g., inert cavities 124, 126 are formed to the left in FIG. 2a) of the hot spot region 122a to well into the slider material. This is because the present lithographic tolerances (e.g., stack up tolerance is about plus or minus 6 microns with 3 sigma) are not good enough to place the trench/moat upstream boundary between the reader shields 140, 142 (which are to be protected from the etch and can be seen in FIG. 4) and the hot spot region. As such, the return pole and the reader structure would also be exposed to the etch if they were not also covered by their own masks. Thus the two additional benign cavities (124, 126) are gratuitously created (one between the return pole and the reader shields and the other between the reader shields and the upstream boundary of the conventional photo-mask rectangle as shown in FIG. 6).

The areas of these incidental cavities (124, 126) do not contribute significantly to the loss of ABS push back because they have no bleed channel to relieve their pressure. The first cavity 124 is dammed up by the un-etched return pole and the latter one 126 by the un-etched reader shields (see also FIG. 4). The high pressure in these two cavities (124, 126) and the low pressure of the hot spot region 122a containing trench/moat 112a can be verified by modeling and observing the ABS analysis results. It is expected that over time these cavities (124, 126) may benignly fill with disk lube to the level of the un-etched ABS. The strong likelihood that these cavities will have negligible impact on head to media spacing can be confirmed by comparing the un-etched spacing to the etched spacing in various modeling results.

As can also be seen in FIG. 2a, the trench/moat 112a boundary extends to the back/trailing edge 118 of the slider 100 so that the ABS pressure is bled down by approximately the ratio of the depth of the trench/moat 112a to the head to media spacing (e.g., when the DFH bulge is activated for the target head to media spacing). The loss of push back due to the trench/moat is approximately by the ratio of the trench/moat area to that of the DFH bulge. Therefore, it is desirable that the trench/moat be kept small relative to the DFH bulge to preserve push back.

FIG. 2b is an expanded top view of a portion of the slider 100 of FIG. 2 including the hot spot region 112b and surrounding trench 122b where the trench 122b extends to the trailing edge 118 of the slider 100 and the inert cavities of the hot spot region 112b have been eliminated in accordance with a second primary embodiment of the invention. As ABS photolithographic tolerances improve in the future (possibly by about 50% or more), the incidental/inert cavities (124, 126) can be eliminated by placing the rectangular boundary edge between the hot spot (e.g., NFT and waveguide core) and the leading edge of the return pole. The etching of the write return pole 132 (not visible in FIG. 2b but see FIG. 4) can have negligible impact on its magnetic function. If it proves necessary, the magnetic activation of the return pole 132 can be avoided by canceling the external field activation of the ferrofluidic etching process with a contrary daisy chained coil activation generated field. Ferrofluidic etching processes are described in greater detail below in the discussion of FIGS. 5, 6, 7a, and 7b.

Figure 7A:
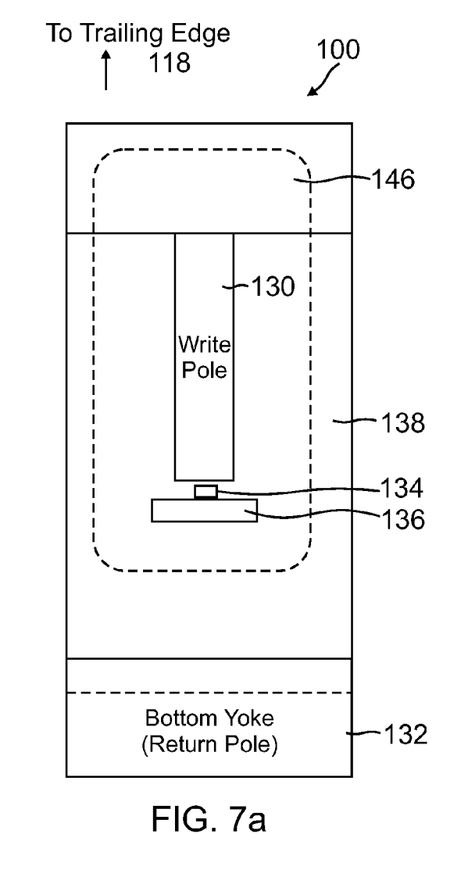
FIG. 7a is an expanded top view of the ABS portion of the slider of FIG. 2a showing the write pole, the NFT, the wave guide core, the cladding and a ferrofluid self aligning mask used during a sub-process for forming the trench that surrounds the hot spot region in accordance with one embodiment of the invention.
Figure 7B:
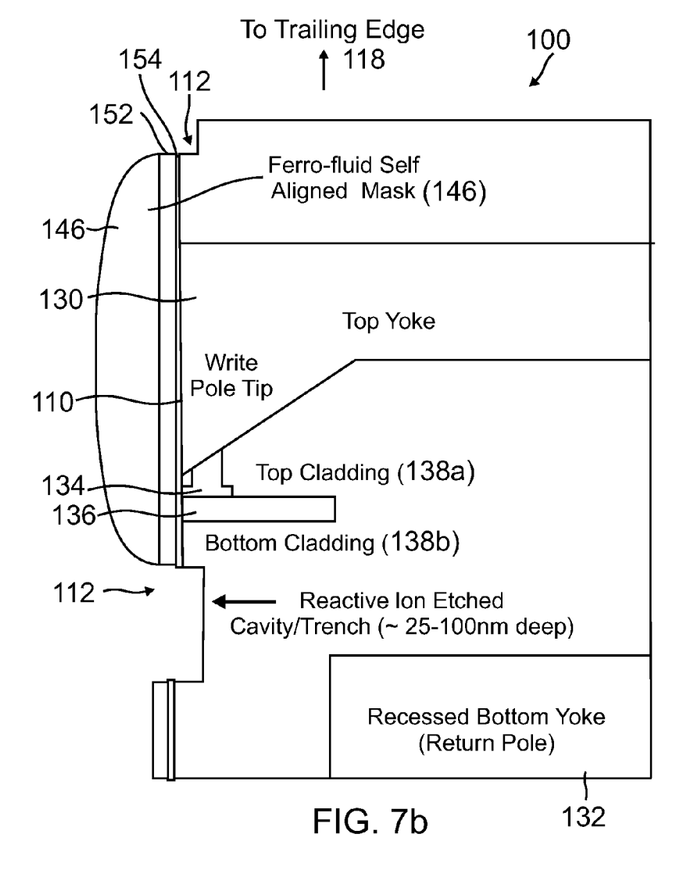
FIG. 7b is a side cross sectional view of the ABS portion of the slider of FIG. 7a further illustrating the ferrofluid self aligning mask in accordance with one embodiment of the invention.

Alternately, the presence of the return pole (and its blob of ferrofluid mask) at the ABS can be avoided by receding the surface of the return pole from the ABS (with little magnetic performance impact) during the wafer patterning of the return pole (see for example, FIGS. 7a and 7b illustrating a recessed return pole). The ferrofluidic masking processes can be provided as described in U.S. Pat. No. 7,526,856 to Nikitin, the entire content of which is hereby incorporated by reference, or by using daisy chained writer coils of the recording head that are activated by a common current source with the bar edge electrical contact pads wired together. The etching processes for forming the trench 112b using ferrofluidic masking are described in greater detail below in the discussion of FIGS. 5, 6, 7a, and 7b.

Figure 3:
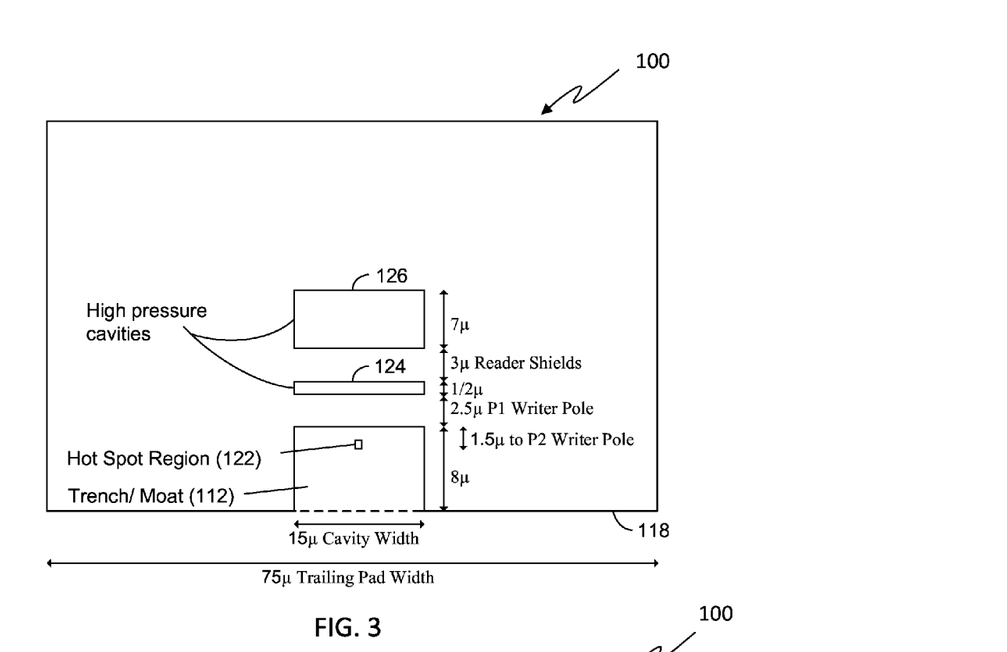
FIG. 3 is an expanded top view illustrating various exemplary dimensions of the portion of the slider of FIG. 2a that includes the hot spot region and surrounding trench where the trench extends to the trailing edge of the slider in accordance with the second primary embodiment of the invention.

FIG. 3 is an expanded top view illustrating various exemplary dimensions of the portion of the slider 100 of FIG. 2a that includes the hot spot region 122 and surrounding trench 112 where the trench 112 extends to the trailing edge 118 of the slider in accordance with the first primary embodiment of the invention. The incidental cavities (124, 126) and their exemplary dimensions are also shown in FIG. 3. As can be seen in FIG. 3, the width of the trench/moat 112 is about 15 microns and the length or distance from the trailing edge 118 is about 8 microns. Note that length and width dimensions used here are reversed from their conventional geometries in which lengths are longer than widths in accordance with the use of these dimensions in the field of magnetic transducers for hard disk drives. The first incidental cavity 124 has a width of about 15 microns and a length of about 0.5 microns, while the second incidental cavity 126 has a width of about 15 microns and a length of about 7 microns. The masked region over the hot spot or hot spot region 122 can have a length of about 0.5 to 2 microns and a width of about 0.5 to 2 microns, while the hot spot can have a substantially circular shape with a diameter of about 0.05 microns. In other embodiments, each of the cavities, including the trench, can have other suitable dimensions. For example, in one embodiment, the width of the trench/moat 112 is about 5 to 50 microns and the length or distance from the trailing edge 118 is about 4 to 20 microns.

In many embodiments, the area of the region enclosed by the trench is greater than the area defined by the hot spot region 122. In several embodiments, the masked hot spot region 122 includes the write pole of the slider 100 (see also FIG. 4). In some embodiments, the masked hot spot region 122 includes the near field transducer and the waveguide core of the slider 100 (see also FIG. 4). In FIG. 3, the trench 112 has a substantially rectangular ring shape with an open side at the trailing edge 118 of the slider 100. In other embodiments, the trench 112 can have other suitable shapes (e.g., substantially rounded rectangular ring with an open side at the trailing edge 118 of the slider 100). In the embodiment illustrated in FIG. 3, the trench 112 can have a depth of about 25 nanometers to about 100 nanometers. In other embodiments, the trench can have other suitable dimensions. In a number of embodiments, the area of the region enclosed by the trench is smaller than the area of the region enclosed by the DFH bulge (not visible in FIG. 3 but see 113 in FIG. 1) to preserve a preselected quantity of push back on the ABS.

Figure 4:
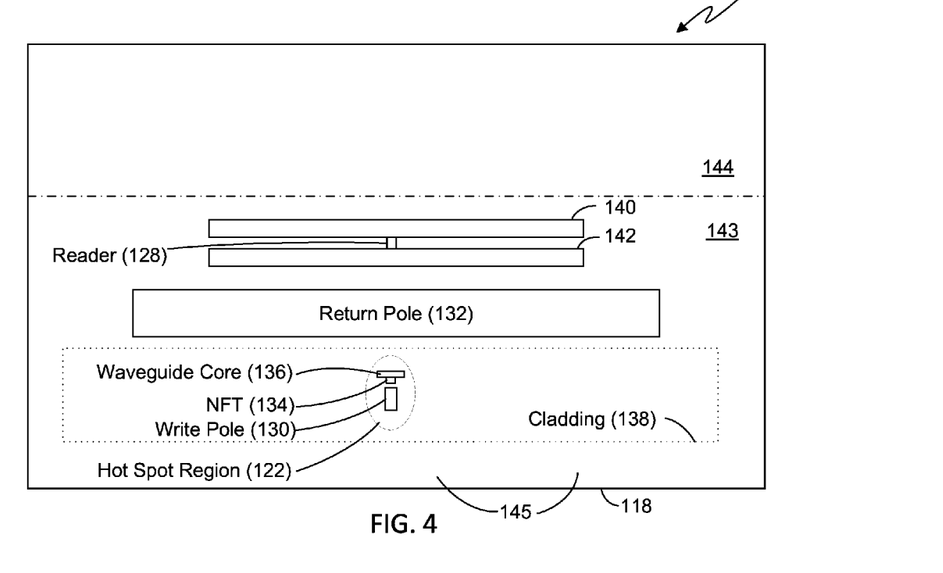
FIG. 4 is an expanded top view of the ABS portion of the slider of FIG. 2a showing the components of the magnetic transducer including a reader, a writer including a write pole and a return pole, and a near field transducer (NFT) including a wave guide core and a cladding prior to forming cavities such as the trench in accordance with the first primary embodiment of the invention.

FIG. 4 is an expanded top view of the ABS portion of the slider 100 of FIG. 2a showing the components of the magnetic transducer including a reader 128, a writer including a write pole 130 and a return pole 132, and a near field transducer (NFT) 134 including a wave guide core 136 and a cladding 138 prior to formation of any cavities including the trench in accordance with the first primary embodiment of the invention. The reader 128 includes reader shields (140, 142) positioned upstream and downstream of the reader 128. The magnetic transducer also includes a encapsulation layer 145 positioned downstream of the cladding 138, and which may be formed of $Al_2O_3$ or another suitable material. The cladding 138 can be formed of $SiO_2$ or another suitable material. The ABS portion of the slider 100 includes a slider body layer 144 and a base layer 143 where the reader 128 and writer (130, 132) are formed. The base layer 143 further includes the encapsulation layer 145. The slider body layer 144 can be formed of AlTiC or other suitable materials.

Figure 5:
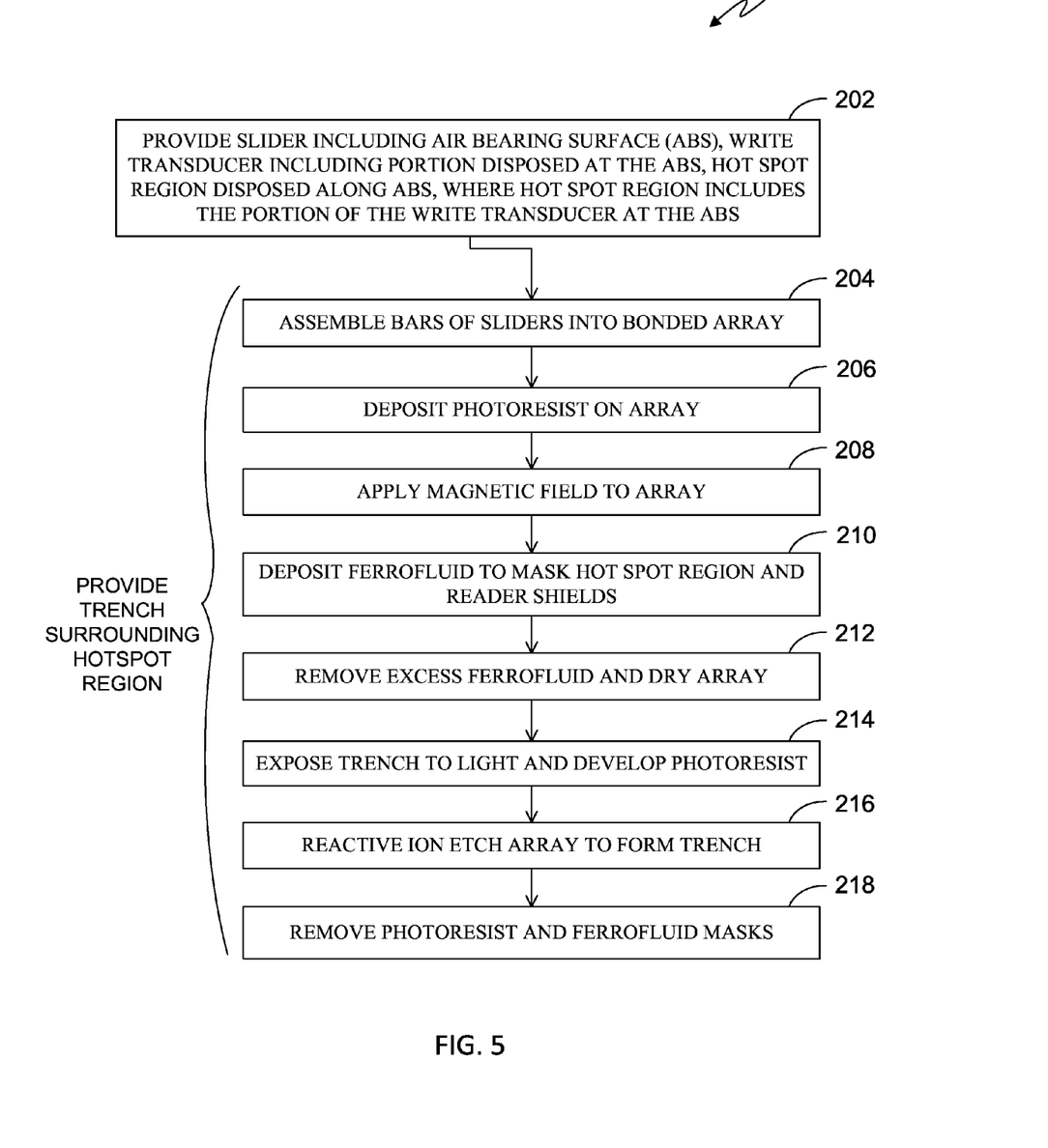
FIG. 5 is a flowchart of a process for forming a slider configured to reduce condensation along an air bearing surface in an energy assisted magnetic recording system including a hot spot region surrounded by a trench in accordance with one embodiment of the invention.

FIG. 5 is a flowchart of a process 200 for forming a slider configured to reduce condensation along an air bearing surface in an energy assisted magnetic recording system in accordance with one embodiment of the invention. The process first provides (202) a slider with an air bearing surface (ABS), a write transducer including a portion disposed at the ABS, a hot spot region disposed along the ABS, where the hot spot region includes the portion of the write transducer at the ABS. The process then provides (204-218) a trench surrounding the hot spot region.

In one embodiment, the process forms the trench using a magnetic field applied to the ABS and a ferrofluid mask deposited on the hot spot region to accurately protect the hot spot during etching. In such case, the process can first assemble (204) bars of sliders into a bonded array. The process then deposits (206) a photoresist layer on the ABS of the array. The process applies (208) a magnetic field to the ABS of the array. The process then deposits (210) the ferrofluid mask on the hot spot region (e.g., to define an inner boundary of the trench) and on the reader shields. In some embodiments, the actions of blocks 208 and 210 are reversed such that the process applies the magnetic field after having deposited the ferrofluid. In such case, the ferrofluid mask forms by attracting ferrofluid particles to the writer and the read shields to form the requisite masks. The process can then remove (212) excess ferrofluid and dry the array while maintaining the applied magnetic field to preserve the masks. The process then patterns (214) the photoresist layer (e.g., expose trench to light and develop resist) to define an outer boundary of the trench and the hot spot region and reader protecting masks (e.g., ferrofluid mask protects underlying photoresist mask from exposure to light). The process then reactive ion etches (216) areas of the ABS not protected by the photoresist and/or the ferrofluid mask to form the trench. The process then removes (218) the ferrofluid mask and remaining portions of the photoresist layer. In several embodiments, the etching is performed using reactive ion etching (RIE) or another suitable etching process. Examples of processes using ferrofluid masks are described in U.S. Pat. No. 7,526,856 to Nikitin.

In other embodiments, the process forms the trench using a mask electroplated on to the hot spot region. More specifically, the process electroplates a mask on the hot spot region (which can include depositing photoresist, exposing and developing the photoresist), etches areas of the ABS not protected by the electroplated mask and photoresist mask to form the trench, and then removes the electroplated mask and any remaining photoresist. In one such embodiment, the electroplated mask is made of one or more materials including Cu, Zn, or another suitable material.

In one such embodiment, a process for forming the trench using a mask electroplated on to the hot spot region could work as follows, After the bar lap process is complete, a layer of electrically conductive (but high resistivity) carbon over coat 154 is sputtered on to the ABS. The bars are then bonded into an array with conductive adhesive. A photo mask is then applied and the trenches/moats 122 are patterned by exposing them to light and developing the photoresist. The array is then connected to the negative terminal of a power source while the positive terminal is connected to a copper anode in an electrolyte bath containing Cupric-Sulfate. The array of bars is then placed in the electrolyte for a time that yields a plated blob of copper, with the desired dimensions, onto the hot spot region 122 and the reader shields 140, 142 and the exposed regions of the electrically conductive AlTiC slider body 100. A much thinner layer of plated copper will also be deposited in the regions of the trench/moat 122 that do not contain conductive objects such as the reader shields (140, 142) or the write pole 130 and NFT 134, (that are electrically connected to the AlTiC slider body 100, during the wafer process that forms them).

This thin layer of copper results from lateral conduction of plating current in the high resistivity carbon overcoat. This un-wanted, thin copper deposit can be made acceptably thin with proper design of the carbon overcoat thickness and resistivity and by setting the plating current well above the minimum for plating consistent with yielding the desired copper mask thickness over the hot spot region 122 and the reader shields (140, 142), in a plating time that is long enough to be controlled accurately. The high plating current density that results will lead to preferential deposition in regions with high electrical conductivity to the AlTiC slider body 100. Plating in the regions where the plating current must travel large lateral distances in the weakly conductive carbon over coat will be suppressed by the voltage drop in this lateral path through the carbon over coat. This undesired thin layer of copper over the trench/moat 112 region may require extra reactive ion etching time (RIE) to remove it before the actual etching of the trench commences. After the RIE is complete, the copper and photoresist masks is chemically stripped. In other embodiments, other suitable variations of this process for forming the trench using a mask electroplated on to the hot spot region can be used.

In one embodiment, the process can perform the sequence of actions in a different order. In another embodiment, the process can skip one or more of the actions. In other embodiments, one or more of the actions are performed simultaneously. In some embodiments, additional actions can be performed.

FIG. 6 is an expanded top view of the ABS portion of the slider of FIG. 2a and FIG. 4 showing the components of the magnetic transducer including the reader 128, the writer including the write pole 130 and the return pole 132, the near field transducer (NFT) 134, the wave guide core 136 and the wave guide cladding 138 and various masks (146, 148, 150) used during a sub-process for forming the trench that surrounds the hot spot region 122 in accordance with one embodiment of the invention. A photoresist layer 152 is also deposited on the outer areas of the ABS portion of the slider 100. In some embodiments, the photoresist layer 152 is limited to an area along the ABS near the magnetic transducer. A first ferrofluid mask 146 is positioned over the hot spot region 122. A second ferrofluid mask 148 is positioned over the return pole 132. A third ferrofluid mask 150 is positioned over the reader 128 and the reader shields (140, 142). The ABS portion of the slider 100 includes a slider body layer 144 covered with the photoresist 152 and a base layer 143 where selected portions of the base layer 143 are covered with the photoresist 152. The base layer 143 further includes the encapsulation layer 145.

In a number of embodiments, the ferrofluid masks (146, 148, 150) are deposited after a magnetic field has been applied to achieve a very accurate positioning of the masks. Subsequent processing can involve etching the areas not protected by the masks (146, 148, 150) or photoresist 152 to form the trench and incidental cavities, and later removing the masks and photoresist. The ferrofluid masks are made of a liquid which becomes strongly magnetized in the presence of a magnetic field. In several embodiments, the liquids contain nanoscale ferromagnetic particles such as ultra-fine iron oxide grains or other suitable ferromagnetic particles. In several embodiments, the particular ferrofluid masks can be selected from commercially available ferrofluids known in the art. After the ferrofluidic mask is deposited, the rectangular trench region is exposed to light and the photoresist is developed.

FIG. 7a is an expanded top view of the ABS portion of the slider 100 of FIG. 2b and FIG. 4 showing the write pole 130, the NFT 134, the wave guide core 136, the cladding 138 and the ferrofluid self aligning mask 146 used during a sub-process for forming the trench that surrounds the hot spot region in accordance with one embodiment of the invention. The return pole or bottom yoke 132 is also shown at the bottom of FIG. 7a. In this embodiment, the return pole 132 is recessed from ABS during the wafer fabrication procedures which forms the read and write structures (see FIG. 7b).

FIG. 7b is a side cross sectional view of the ABS portion of the slider of FIG. 7a further illustrating the ferrofluid self aligning mask 146 in accordance with one embodiment of the invention. The cladding 138 includes a top cladding 138a positioned above the wave guide core 136 and a bottom cladding 138b positioned below the wave guide core 136. The trench 112 has been etched (e.g., using reactive ion etching) beyond the ferrofluid self aligning mask 146 (and photoresist 152) and to the trailing edge 118 of the slider 100 to form a cavity that is about 25 to 100 nanometers deep. In other embodiments, the depth of the cavity can be about 25 nanometers to about 1 micron. In one embodiment, the depth of the cavity can go deep enough that it does not interfere with other writer component structures. In several embodiments, the depth of the cavity can be changed while still retaining the desired low pressure provided by the trench. A carbon over coat (COC) 154 has been deposited on the ABS 110 before the ferrofluid self aligning mask 146 is deposited. The layer of photoresist 152 is positioned between the ferrofluid mask 146 and the carbon overcoat 152. In the embodiment of FIG. 7b, reactive ion etching is used to form the trench. In other embodiments, other suitable methods of etching can be used to form the trench.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A slider configured to reduce condensation along an air bearing surface in an energy assisted magnetic recording system, the slider comprising:
    an air bearing surface (ABS);
    a write transducer comprising a portion disposed at the ABS;
    a hot spot region disposed along the ABS, wherein the hot spot region comprises the portion of the write transducer at the ABS; and
    a trench surrounding the hot spot region.

2. The slider of claim 1, wherein the trench extends to a trailing edge of the slider.

3. The slider of claim 1, further comprising:
    a dynamic fly height (DFH) heating element configured to cause a portion of the slider to expand when activated;
    a DFH bulge disposed along the ABS, wherein the DFH bulge consists of a region along the ABS that expands and extends away from the ABS when the DFH heating element is activated; and
    wherein a region enclosed by the trench is smaller than a region enclosed by a full width half maximum of the DFH bulge, thereby preserving a preselected quantity of push back.

4. The slider of claim 1, wherein a region enclosed by the trench is greater than the hot spot region.

5. The slider of claim 1, wherein the hot spot region comprises a write pole of the slider.

6. The slider of claim 5, wherein the hot spot region comprises a near field transducer and a waveguide core of the slider.

7. The slider of claim 1, wherein the trench comprises a shape selected from the group consisting of a rectangular ring with an open side at a trailing edge of the slider and a substantially rounded rectangular ring with an open side at the trailing edge of the slider.

8. The slider of claim 7:
    wherein the trench comprises the rectangular ring with the open side at the trailing edge of the slider;

wherein the trench comprises a width of about 5 microns to about 50 microns and a length of about 4 microns to about 20 microns; and wherein the trench comprises a depth of about 25 nanometers to about 1 micron.

9. The slider of claim 8:

wherein the trench comprises a width of about 15 microns and a length of about 8 microns; and wherein the trench comprises a depth of about 25 nanometers to about 100 nanometers.

10. The slider of claim 1, wherein the trench is formed using a ferrofluid mask.

11. The slider of claim 10, wherein the ferrofluid mask is configured to protect the hot spot region in conjunction with a photoresist mask during an etching process.

12. The slider of claim 1, wherein the trench is formed using a mask deposited with electroplating over the hot spot region and a reader of the slider.

13. The slider of claim 12, wherein the electroplated mask is configured to protect the hot spot region during an etching process.

14. The slider of claim 12, wherein the electroplated mask is configured to protect the hot spot region and the reader during an etching process.

15. A method for forming a slider configured to reduce condensation along an air bearing surface in an energy assisted magnetic recording system, the method comprising:

providing a slider comprising an air bearing surface (ABS), a write transducer comprising a portion disposed at the ABS, and a hot spot region disposed along the ABS, wherein the hot spot region comprises the portion of the write transducer at the ABS; and providing a trench surrounding the hot spot region.

16. The method of claim 15, wherein the providing the trench surrounding the hot spot region comprises:

depositing a photoresist layer on the ABS;

applying a magnetic field to the ABS;

depositing a ferrofluid mask on the hot spot region to define an inner boundary of the trench;

patterning the photoresist layer to define an outer boundary of the trench;

etching areas of the ABS not protected by the photoresist or the ferrofluid mask to form the trench; and removing the ferrofluid mask and remaining portions of the photoresist layer.

17. The method of claim 16, wherein the etching areas of the ABS not protected by the photoresist or the ferrofluid mask to form the trench comprises performing reactive ion etching on the areas of the ABS not protected by the photoresist or the ferrofluid mask to form the trench.

18. The method of claim 15, wherein the providing the trench surrounding the hot spot region comprises:

electroplating a mask on the hot spot region;

etching areas of the ABS not protected by the electroplated mask to form the trench; and removing the electroplated mask.

19. The method of claim 18, wherein the mask comprises a material selected from the group consisting of Cu, Zn, and combinations thereof.

20. The method of claim 18, wherein electroplating the mask on the hot spot region comprises electroplating the mask on the hot spot region on a reader of the slider.

21. The method of claim 15, wherein the trench extends to a trailing edge of the slider.

22. The method of claim 15:

a dynamic fly height (DFH) heating element configured to cause a portion of the slider to expand when activated;

wherein the slider further comprises a DFH bulge disposed along the ABS, wherein the DFH bulge consists of a region along the ABS that expands and extends away from the ABS when the DFH heating element is activated; and wherein a region enclosed by the trench is smaller than a region enclosed by the DFH bulge, thereby preserving a preselected quantity of push back.

23. The method of claim 15, wherein a region enclosed by the trench is greater than the hot spot region.

24. The method of claim 15, wherein the hot spot region comprises a write pole of the slider.

25. The method of claim 24, wherein the hot spot region comprises a near field transducer and a waveguide core of the slider.

26. The method of claim 15, wherein the trench comprises a shape selected from the group consisting of a rectangular ring with an open side at a trailing edge of the slider and a substantially rounded rectangular ring with an open side at the trailing edge of the slider.

27. The method of claim 26:

wherein the trench comprises the rectangular ring with the open side at the trailing edge of the slider;

wherein the trench comprises a width of about 5 microns to about 50 microns and a length of about 4 microns to about 20 microns; and wherein the trench comprises a depth of about 25 nanometers to about 1 micron.

28. The method of claim 27:

wherein the trench comprises a width of about 15 microns and a length of about 8 microns; and wherein the trench comprises a depth of about 25 nanometers to about 100 nanometers.

* * * * *